US008825519B2

(12) United States Patent
Sun

(10) Patent No.: US 8,825,519 B2
(45) Date of Patent: Sep. 2, 2014

(54) SYSTEMS AND METHODS TO SEARCH WITH A MOBILE DEVICE

(75) Inventor: Ken Sun, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 1115 days.

(21) Appl. No.: 12/276,274

(22) Filed: Nov. 21, 2008

(65) Prior Publication Data

US 2010/0131367 A1    May 27, 2010

(51) Int. Cl.
*G06Q 30/00* (2012.01)
*G06Q 90/00* (2006.01)

(52) U.S. Cl.
CPC ..................................... *G06Q 90/00* (2013.01)
USPC ....................................................... 705/14.1

(58) Field of Classification Search
CPC ....................................................... G06Q 90/00
USPC ....................................................... 705/14.1
See application file for complete search history.

(56) References Cited

U.S. PATENT DOCUMENTS

| | | | |
|---|---|---|---|
| 5,682,525 A | 10/1997 | Bouve et al. | |
| 5,835,061 A | 11/1998 | Stewart | |
| 5,852,775 A | 12/1998 | Hidary | |
| 6,085,177 A | 7/2000 | Semple et al. | |
| 6,259,405 B1 | 7/2001 | Stewart et al. | |
| 6,326,918 B1 | 12/2001 | Stewart | |
| 6,385,622 B2 | 5/2002 | Bouve et al. | |
| 6,408,307 B1 | 6/2002 | Semple et al. | |
| 6,415,291 B2 | 7/2002 | Bouve et al. | |
| 6,452,498 B2 | 9/2002 | Stewart | |
| 6,697,018 B2 | 2/2004 | Stewart | |
| 6,759,960 B2 | 7/2004 | Stewart | |
| 7,009,556 B2 | 3/2006 | Stewart | |
| 7,058,594 B2 | 6/2006 | Stewart | |
| 7,840,689 B2 | 11/2010 | Stewart | |
| 2001/0001239 A1 | 5/2001 | Stewart | |
| 2001/0005178 A1 | 6/2001 | Stewart | |
| 2001/0021930 A1 | 9/2001 | Bouve et al. | |
| 2001/0043148 A1 | 11/2001 | Stewart | |
| 2001/0054036 A1 | 12/2001 | Bouve et al. | |
| 2002/0032674 A1 | 3/2002 | Semple et al. | |
| 2002/0046090 A1 | 4/2002 | Stewart | |
| 2004/0164898 A1 | 8/2004 | Stewart | |
| 2004/0186902 A1 | 9/2004 | Stewart | |
| 2006/0164302 A1 | 7/2006 | Stewart | |
| 2006/0183467 A1 | 8/2006 | Stewart | |
| 2007/0061245 A1* | 3/2007 | Ramer et al. .................... 705/37 |

(Continued)

OTHER PUBLICATIONS

"U.S. Appl. No. 12/276,274, Response filed Oct. 7, 2011 to Final Office Action mailed Aug. 10, 2011", 11 pgs.

*Primary Examiner* — Daniel Lastra
(74) *Attorney, Agent, or Firm* — Schwegman Lundberg & Woessner, P.A.

(57) ABSTRACT

Methods and systems to search with a mobile device are described. The system receives a request, over a network, from a mobile device. The request includes search information to search a database and location information to identify the location of the mobile device. Next, the system generates search results based on the search information. The search results include a plurality of items. Next, the system arranges items in the search results based on the location of the mobile device. Finally, the system communicates a user interface, over the network, to the mobile device. The user interface includes the search results. The search results include the items. The arrangement of the items in the search results is based on the location of the mobile device.

14 Claims, 13 Drawing Sheets

(56) References Cited

U.S. PATENT DOCUMENTS

| | | |
|---|---|---|
| 2008/0042899 A1 | 2/2008 | Stewart |
| 2008/0042900 A1 | 2/2008 | Stewart |
| 2008/0045241 A1 | 2/2008 | Stewart |
| 2008/0049696 A1 | 2/2008 | Stewart |
| 2008/0051108 A1 | 2/2008 | Stewart |
| 2008/0057924 A1 | 3/2008 | Stewart |

* cited by examiner

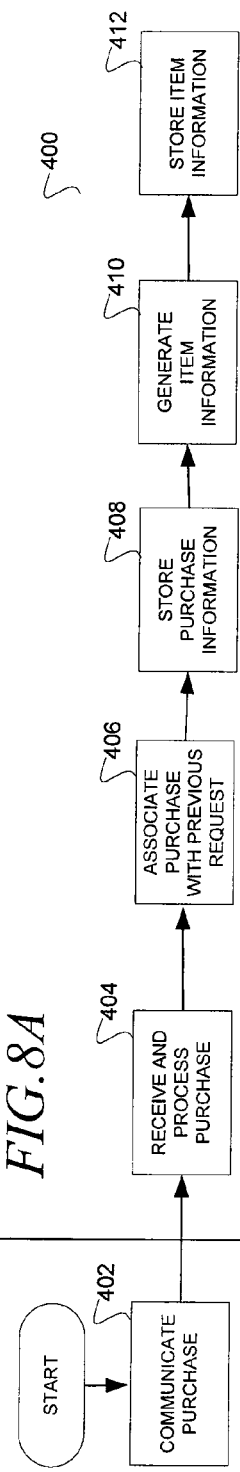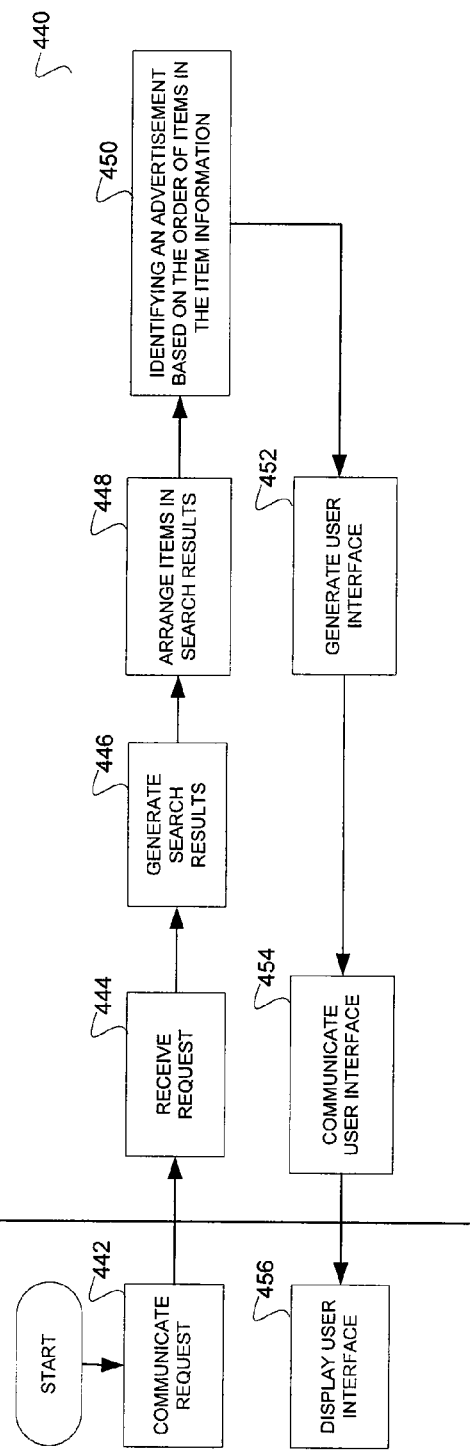

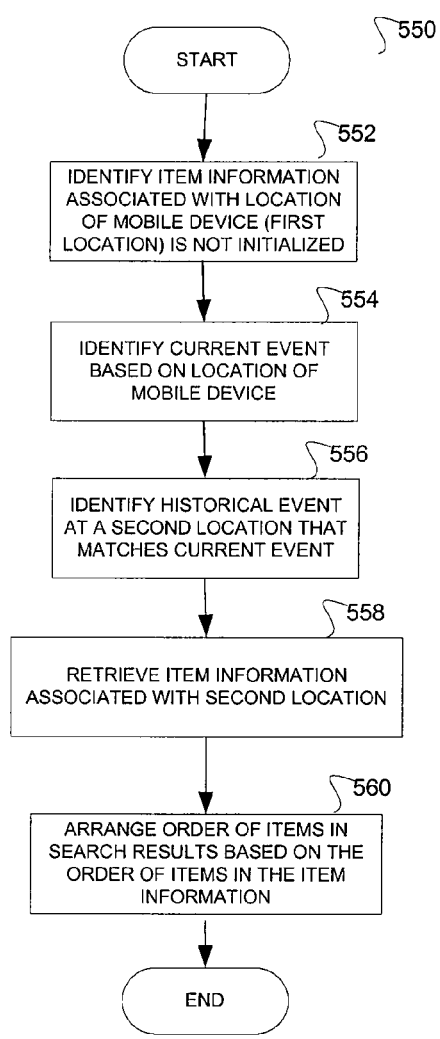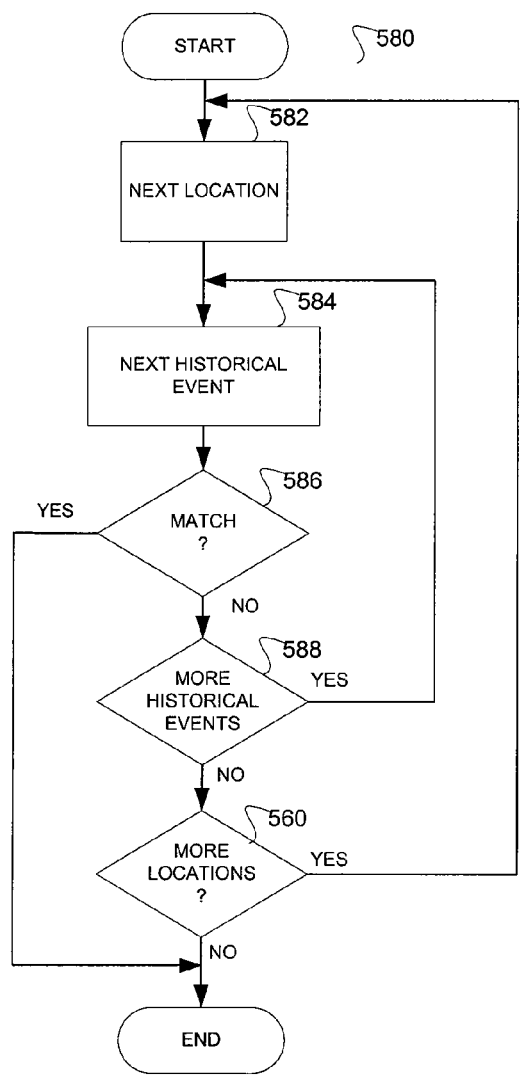

SYSTEMS AND METHODS TO SEARCH WITH A MOBILE DEVICE

TECHNICAL FIELD

This disclosure relates to the technical field of data communications. More particularly, systems and methods to search with a mobile device are described.

RELATED ART

A mobile phone may be used to gather information that is particularly useful at the location where the mobile phone is located. Nevertheless, the mobile phone may be cumbersome because of the small screen size and because the controls are difficult to operate.

BRIEF DESCRIPTION OF THE DRAWINGS

Embodiments illustrated by way of example and not limitation in the figures of the accompanying drawings, in which:

FIG. 8A is a flow chart illustrating a method, according to an embodiment, to generate conversion information;

FIG. 8B is a flow chart illustrating a method, according to an embodiment, to search with a mobile device;

FIG. 11A is a flow chart illustrating a method, according to an embodiment, to arrange items in search results;

FIG. 11B is a flow chart illustrating a method, according to an embodiment, to associate a current event with an historical event at a second location;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to search with a mobile device are provided. Various embodiments are described below in connection with the figures provided herein.

Figure 1:
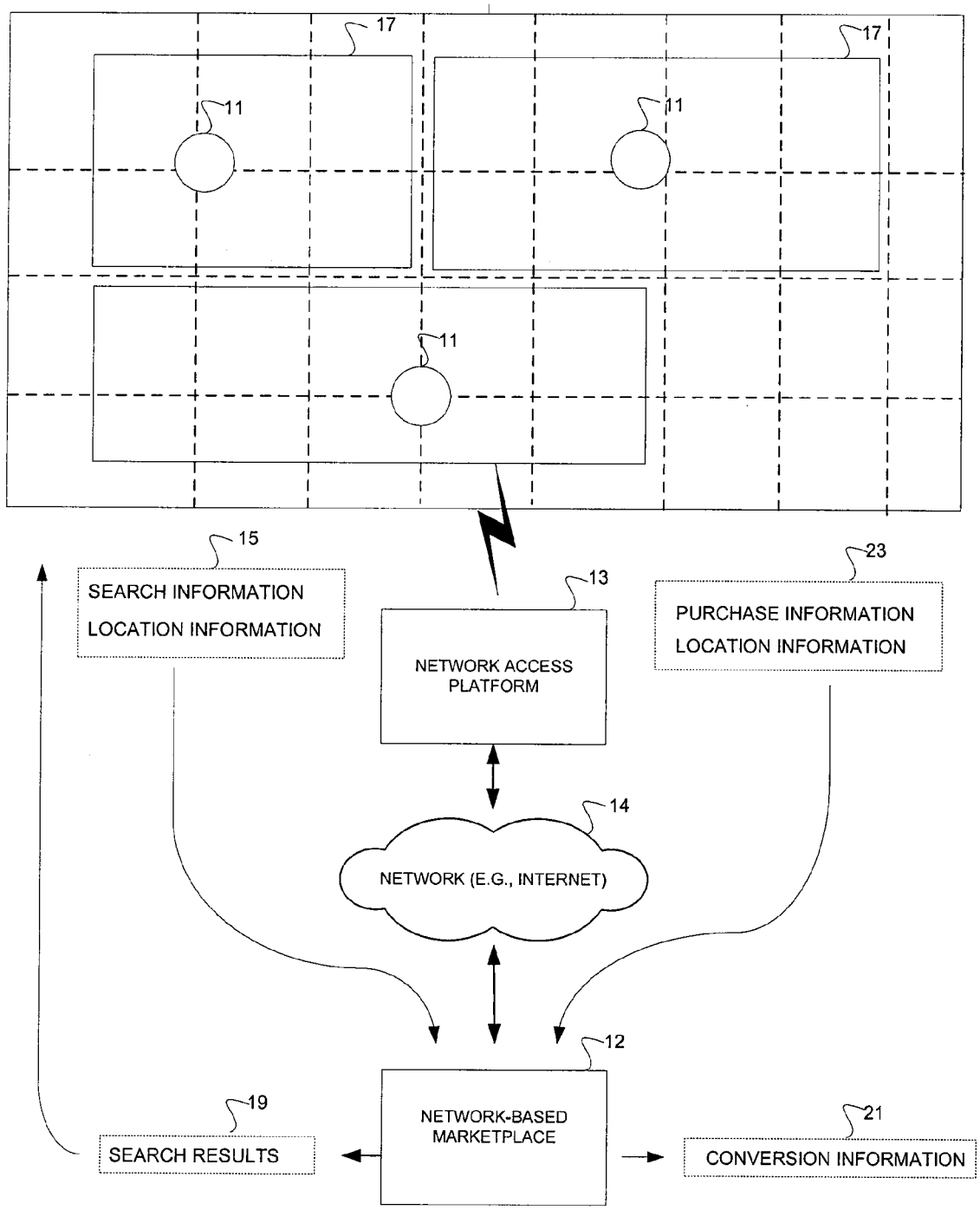
FIG. 1 illustrates a system, according to an embodiment, to search with a mobile device.

According to a first aspect of the present disclosure a method and system to search with a mobile device is disclosed. The system may receive a request, over a network, from a mobile phone. The request may include search information to search for items for sale on a network-based marketplace. The request may further include the location of the mobile phone. For example, the mobile phone may be located in a "Best Buy" retail store in San Jose, Calif. and the request may include the keywords "Plasma Screen TV." Further, the request may be communicated to a network-based marketplace from which a "Plasma Screen TV" may be purchased for a fixed-price or with a winning bid in an auction. Indeed, the operator of the mobile phone may be comparing prices to make an informed purchase. In response to receiving the request, the network-based marketplace may use the keywords to search a database and generate search results that include the requested items for purchase. For example, in response to the keywords "Plasma Screen TV," the network-based marketplace may return search results including items comprising multiple "Plasma Screen TVs" of different models and makes. Next, the network-based marketplace may arrange the items in the search results based on prior purchases from the same location that were made in a predetermined period of time after a prior search from the same location. For example, the network-based marketplace may have previously received one hundred requests to search for items for sale. The requests may have included the same or similar keywords "Plasma Screen TV" and were previously communicated from a mobile device in the same location. Further, the network-based marketplace may have further received a request to purchase an item within a predetermined period of time from the mobile device after receiving a request to search for items. Aggregation of such information may reveal that the one hundred requests to search for "Plasma Screen TVs" are associated with five purchases of Panasonic Plasma Screen TVs, two purchases of Sony Plasma Screen TVs, and one purchase of a Samsung Plasma Screen TV. The network-based marketplace stores this information as conversion information and uses the conversion information to arrange the order of items in subsequent search results. For example, the items may be ordered from most likely to be purchased to least likely to be purchased. In yet another example, the network-based marketplace may use the conversion information to select an advertisement that may be positioned on an interface with the search results. One technical benefit of the above approach may include identifying optimal search results for a mobile device. Indeed, the display area of a mobile device is relatively small compared with the display area of other devices capable of facilitating network communication. Accordingly, the identification and presentation of optimal items may reduce the time and effort of an operator of a mobile device who would otherwise might browse multiple screens. According to a second aspect of the present disclosure another method and system to search with a mobile device are disclosed. The system may receive a request, over a network, from a mobile phone and arrange the search, as described above. However, the search results are not arranged results based on conversion information that is accessed according to search information (e.g., keywords, categories, etc.) and the location of the mobile device. Rather, the search results are arranged according to conversion information that is accessed according to a matching location. For example, consider a request to search for items that is received from a mobile phone in a first location that is not initialized with conversion information as described above. In such a case the conversion information that is available at a matching location may be utilized. For example, matching locations may include the same or nearly the same types of retail stores. In another example, matching locations may include approximately the same percentages of types of commercial establishments (e.g., fifty percent retail, twenty-percent fast food, etc.). In general, various embodiments may use fuzzy matching with a configurable threshold of sameness. According to a third aspect of the present disclosure yet another method and system to search with a mobile device are disclosed. The system may receive a request, over a network, from a mobile phone and arrange the search results, as described above. However, the search results are not arranged based on conversion information in the two previous examples. Rather, the search results are arranged according to conversion information that is accessed according to a location with an historical event that matches a current event in the location of the mobile phone. For example, consider a request to search for items, the request being received from a mobile phone in a first location that is not initialized with conversion information, as described above. In such a case, the conversion information that is initialized for a location with a matching event may be utilized. For example, matching events may include a concert by the same artist (e.g., Bono), a book signing by an author, a political rally (e.g., Barak Obama), and so forth. In other words the location of the mobile device may be identified with a current event (e.g., Bono Concert) and a second location may be identified as a place where the same event has previously occurred (e.g., Bono Concert). Accordingly, the network-based marketplace uses the conversion information associated with a location that is associated with a matching historical event to arrange the items in the search results for the first location. FIG. 1 is a network diagram depicting a networked system 9, within which one example embodiment may be deployed. The networked system 9 is shown to include mobile devices 11 that communicate with a network access platform 13 that, in turn, communicates with a network-based marketplace 12 over a network 14 (e.g., the Internet). A mobile device 11 may communicate a request 15 to search for items that are for sale on the network-based marketplace 12. The request 15 may include search information and location information. The search information may include keywords, categories, parameters, price-ranges, and/or other constraints that may be used to search for the items. The location information identifies the location of the mobile device 11. The location information may be used by the network-based marketplace 12 or the network access platform 13 to identify locations 17 in which the mobile device is communicating. In response to receiving the request 15 the network-based marketplace 12 may generate search results 19 that include the requested items, arrange the items in the search results 19 based on conversion information 21, described below, that is accessed according to the search information and the location information, and communicate an interface that includes the arranged items back to the mobile device. For example, the items in the search results 19 may be arranged from most likely to be purchased appearing at the top of a user interface and items least likely to be purchased appearing at the bottom of the user interface. A mobile device 11 may further communicate a request 23 to purchase an item on the network-based marketplace 12. The request 23 may include purchase information and location information. The purchase information may include a winning bid in an auction or an authorization to purchase an item for a fixed-price. The network-based marketplace monitors 12 whether the request 23 is preceded by a request 15 from the same mobile device 11 within a predetermined period of time. In response to identifying the receipt of the pair of requests within the predetermined period of time, the network-based marketplace 12 may generate the conversion information 21.

Figure 2:
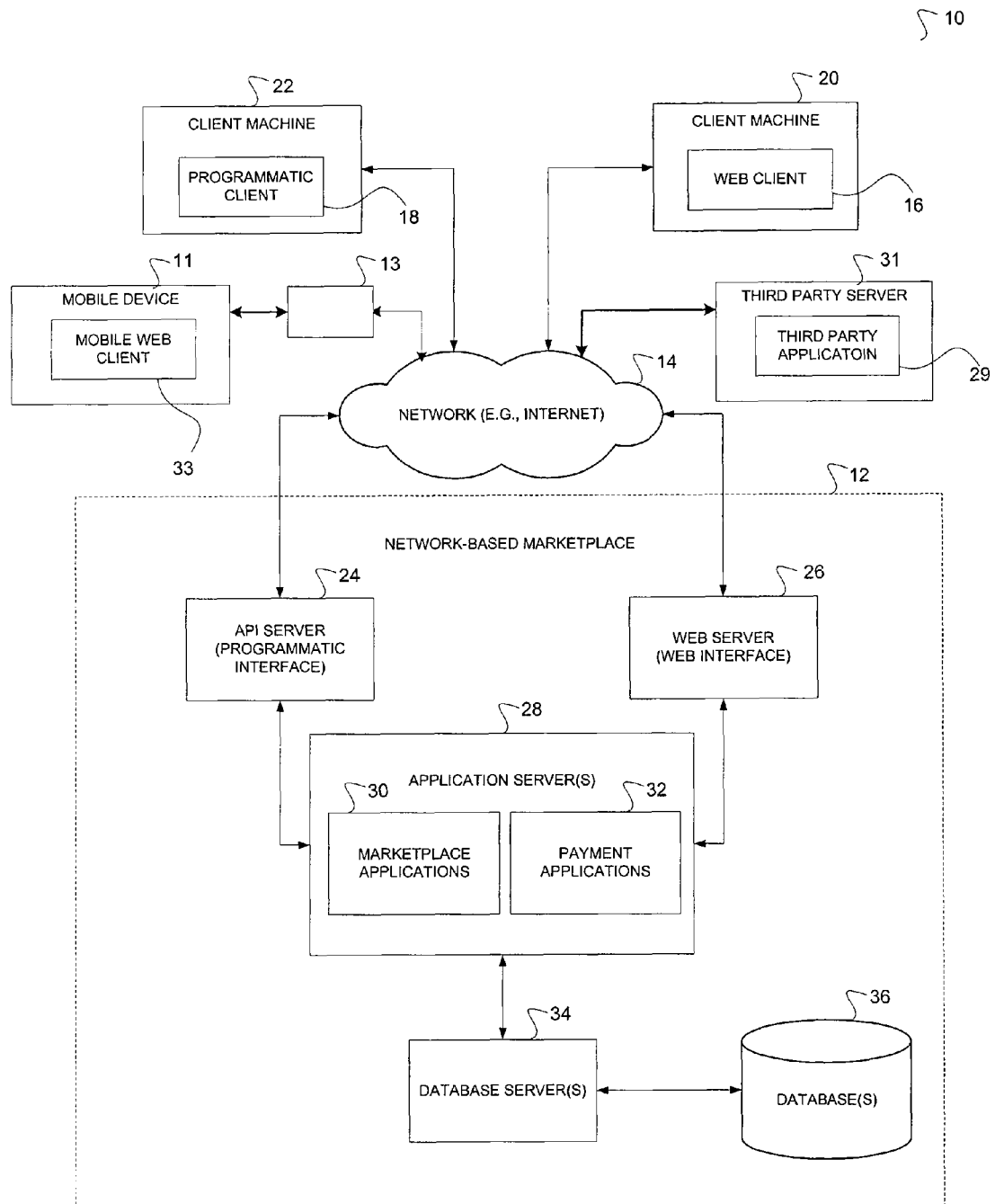
FIG. 2 further illustrates the system, according to an embodiment, to search with a mobile device.

FIG. 2 is a network diagram depicting a networked system 10, within which one example embodiment may be deployed. The system 10 corresponds to the system 9 in FIG. 1 and, accordingly, the same or similar references have been used to indicate the same or similar features unless otherwise indicated. A network-based marketplace 12 provides server-side functionality, via a network 14 (e.g., the Internet or Wide Area Network (WAN)) to one or more clients. FIG. 2 illustrates, for example, a web client 16 (e.g., a browser, such as the Internet Explorer browser developed by Microsoft Corporation of Redmond, Washington State) executing on client machine 20, a programmatic client 18 executing on client machine 22, and a mobile web client 33 executing on mobile device 11. For example, the mobile web client 33 may be embodied as one or more mobile modules that are used to support the Blackberry™ wireless hand held business or smart phone manufactured by Research In Motion of Waterloo, Ontario.

An Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 36.

The marketplace applications 30 may provide a number of marketplace functions and services to users that access the network-based marketplace 12. The payment applications 32 may likewise provide a number of payment services and functions to users. The payment applications 32 may allow users to accumulate value in accounts and then to later redeem the accumulated value for products (e.g., goods or services) that are made available via the marketplace applications 30. The value may be accumulated in a commercial currency, such as the U.S. dollar, or a proprietary currency, such as "points." While the marketplace applications 30 and payment applications 32 are shown in FIG. 2 to both form part of the network-based marketplace 12, it will be appreciated that, in alternative embodiments, the payment applications 32 may form part of a payment service that is separate and distinct from the network-based marketplace 12.

Further, while the networked system 10 shown in FIG. 2 employs a client-server architecture, embodiments of the present disclosure are of course not limited to such an architecture and could equally well find application in a distributed, or peer-to-peer, architecture system, for example. The various marketplace applications 30 and payment applications 32 could also be implemented as standalone software programs, which do not necessarily have networking capabilities.

The web client 16 and mobile web client 33 access the various marketplace applications 30 and payment applications 32 via the web interface supported by the web server 26. Similarly, the programmatic client 18 accesses the various services and functions provided by the marketplace applications 30 and payment applications 32 via the programmatic interface provided by the API server 24. The programmatic client 18 may, for example, be a seller application (e.g., the TurboLister application developed by eBay Inc., of San Jose, Calif.) to enable sellers to author and manage listings on the network-based marketplace 12 in an off-line manner, and to perform batch-mode communications between the programmatic client 18 and the network-based marketplace 12.

FIG. 2 also illustrates a third party application 29, executing on a third party server machine 31, as having programmatic access to the networked system 10 via the programmatic interface provided by the API server 24. For example, the third party application 29 may, utilizing information retrieved from the network-based marketplace 12, support one or more features or functions on a website hosted by the third party. The third party website may, for example, provide one or more promotional, marketplace or payment functions that are supported by the relevant applications of the networked system 10.

The mobile device 11 may be embodied as a mobile phone, a personal digital assistant (PDA), a cell phone, or any other wireless device that is capable of communicating with the network-based marketplace 12. For example, the mobile device 11 may be embodied as an iPhone mobile phone manufactured by Apple, Inc. of Cupertino, Calif., or, as previously mentioned, a Blackberry™ mobile phone manufactured by Research In Motion of Waterloo, Ontario.

Marketplace and Payment Applications

Figure 3:
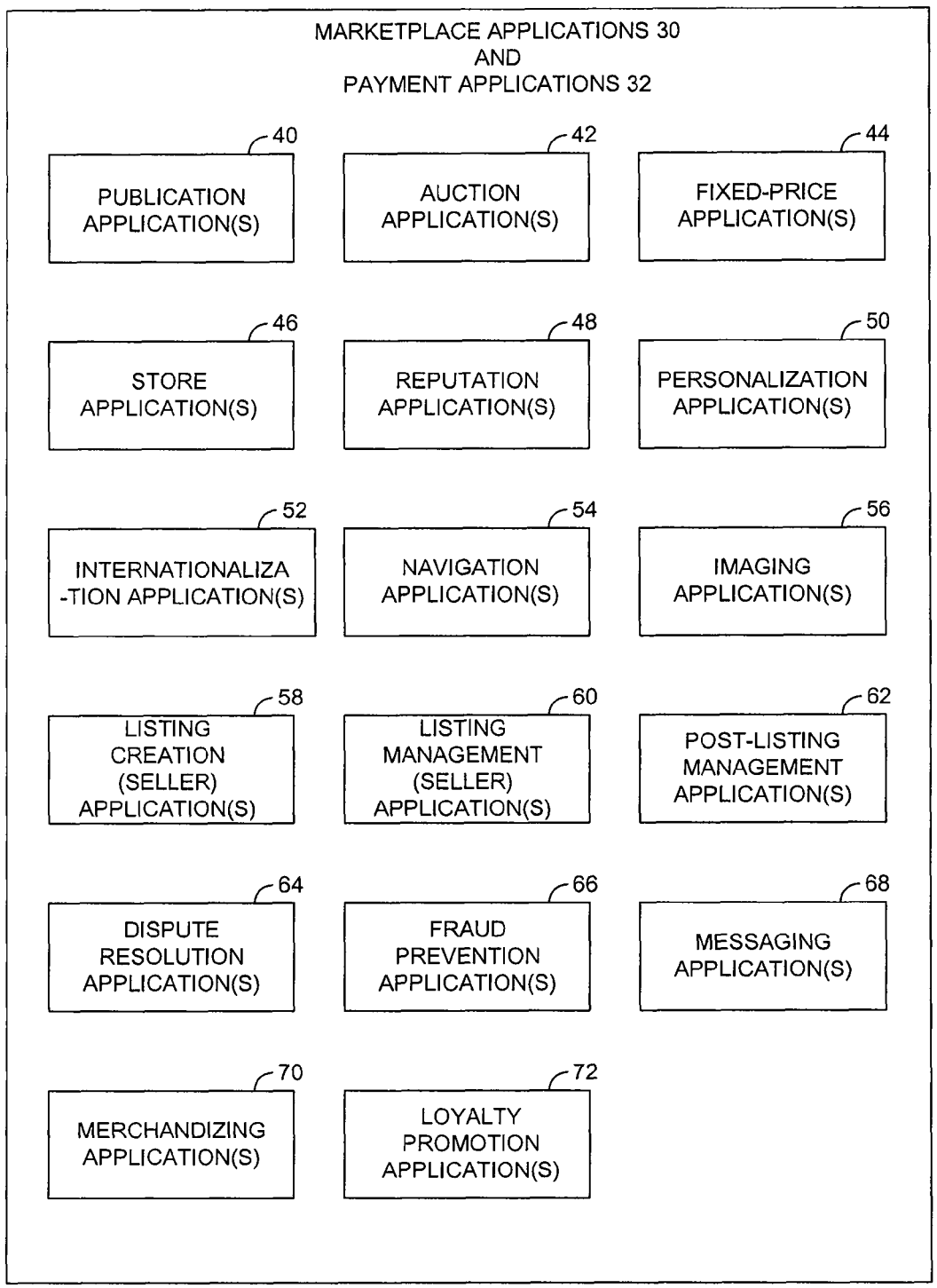
FIG. 3 is a block diagram illustrating marketplace applications and payment applications, according to an embodiment.

FIG. 3 is a block diagram illustrating marketplace applications 30 and payment applications 32 that, in one example embodiment, are provided as part of the networked system 10. The marketplace applications 30 and payment applications 32 may be hosted on dedicated or shared server machines, as shown on FIG. 2, that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 36 via the database servers 34, as shown on FIG. 2.

The network-based marketplace 12 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace applications 30 are shown to include at least one publication application 40 and one or more auction applications 42 which support auction-format listing and price setting mechanisms (e.g., English, Dutch, Vickrey, Chinese, Double, Reverse auctions, etc.). The various auction applications 42 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 44 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store application(s) 46 allows a seller to group listings within a "virtual" store, which may be branded and otherwise personalized by and for the seller. Such a virtual store may also offer promotions, incentives and features that are specific and personalized to a relevant seller.

Reputation applications 48 allow users that transact, utilizing the network-based marketplace 12, to establish, build and maintain reputations, which may be made available and published to potential trading partners. Consider that where, for example, the network-based marketplace 12 supports person-to-person trading, users may otherwise have no history or other reference information whereby the trustworthiness and credibility of potential trading partners may be assessed. The reputation applications 48 allow a user to establish a reputation within the network-based marketplace 12 over time, for example, through feedback provided by other transaction partners. Other potential trading partners may then reference such a reputation for the purposes of assessing credibility and trustworthiness.

Personalization applications 50 allow users of the network-based marketplace 12 to personalize various aspects of their interactions with the network-based marketplace 12. For example a user may, utilizing an appropriate personalization application 50, create a personalized reference page at which information regarding transactions to which the user is (or has been) a party may be viewed. Further, a personalization application 50 may enable a user to personalize listings and other aspects of their interactions with the networked system 10 and other parties.

The networked system 10 may support a number of marketplaces that are customized, for example, for specific geographic regions. A version of the networked system 10 may be customized for the United Kingdom, whereas another version of the networked system 10 may be customized for the United States. Some of these versions may operate as an independent marketplace, or may be customized (or internationalized) presentations of a common underlying marketplace. The networked system 10 may accordingly include a number of internationalization applications 52 that customize information (and/or the presentation of information) by the networked system 10 according to predetermined criteria (e.g., geographic, demographic or marketplace criteria). For example, the internationalization applications 52 may be used to support the customization of information for a number of regional websites that are operated by the networked system 10 and that are accessible via respective servers 24 and 26.

Navigation of the networked-based marketplace 12 may be facilitated by one or more navigation applications 54. For example, a receiving module may receive search information to search for items on the network-based marketplace and a processing application may process that request. A browse application may allow users to browse various category, catalogue, or inventory data structures according to which listings may be classified within the networked system 10. Various other navigation applications may be provided to supplement the search and browsing applications.

In order to make listings available via the networked system 10 as visually informing and attractive as possible, the marketplace applications 30 may include one or more imaging applications 56 with which users may upload images for inclusion within listings. An imaging application 56 also operates to incorporate images within viewed listings. The imaging applications 56 may also support one or more promotional features, such as image galleries that are presented to potential buyers. For example, sellers may pay an additional fee to have an image included within a gallery of images for promoted items.

Listing creation applications 58 allow sellers to conveniently author listings pertaining to goods or services that they wish to transact via the network-based marketplace 12, while the listing management applications 60 allow sellers to manage such listings. Specifically, where a particular seller has authored and/or published a large number of listings, the management of such listings may present a challenge. The listing creation applications may further include a processing module, communication module, and listing module that facilitate a buyer watching for specific types of listings. The listing management applications 60 provide a number of features (e.g., auto-relisting, inventory level monitors, etc.) to assist the seller in managing such listings.

One or more post-listing management applications 62 may also assist sellers with a number of activities that may typically occur post-listing. For example, upon completion of an auction facilitated by one or more auction applications 42, a seller may wish to leave feedback regarding a particular buyer. To this end, a post-listing management application 62 may provide an interface to one or more reputation applications 48, so as to allow the seller conveniently to provide feedback regarding multiple buyers to the reputation applications 48.

Dispute resolution applications 64 provide mechanisms whereby disputes arising between transacting parties may be resolved. For example, the dispute resolution applications 64 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 66 implement fraud detection and prevention mechanisms to reduce the occurrence of fraud within the network-based marketplace 12.

Messaging applications 68 are responsible for the generation and delivery of messages to users of the network-based marketplace 12, with such messages, for example, advising users regarding the status of listings at the network-based marketplace 12 (e.g., providing "outbid" notices to bidders during an auction process or to providing promotional and merchandising information to users). Respective messaging applications 68 may utilize any one of a number of message delivery networks and platforms to deliver messages to users. For example, messaging applications 68 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX—IEEE 802.16) networks.

Merchandising applications 70 support various merchandising functions that are made available to sellers to enable sellers to increase sales via the network-based marketplace 12. The merchandising applications 70 also operate the various merchandising features that may be invoked by sellers and may monitor and track the success of merchandising strategies employed by sellers.

The network-based marketplace 12 itself, or one or more parties that transact via the network-based marketplace 12, may operate loyalty programs that are supported by one or more loyalty promotions applications 72. For example, a buyer may earn loyalty or promotions points for transactions established and/or concluded with a particular seller, and then be offered a reward for which accumulated loyalty points can be redeemed.

Data Structures

Figure 4A:
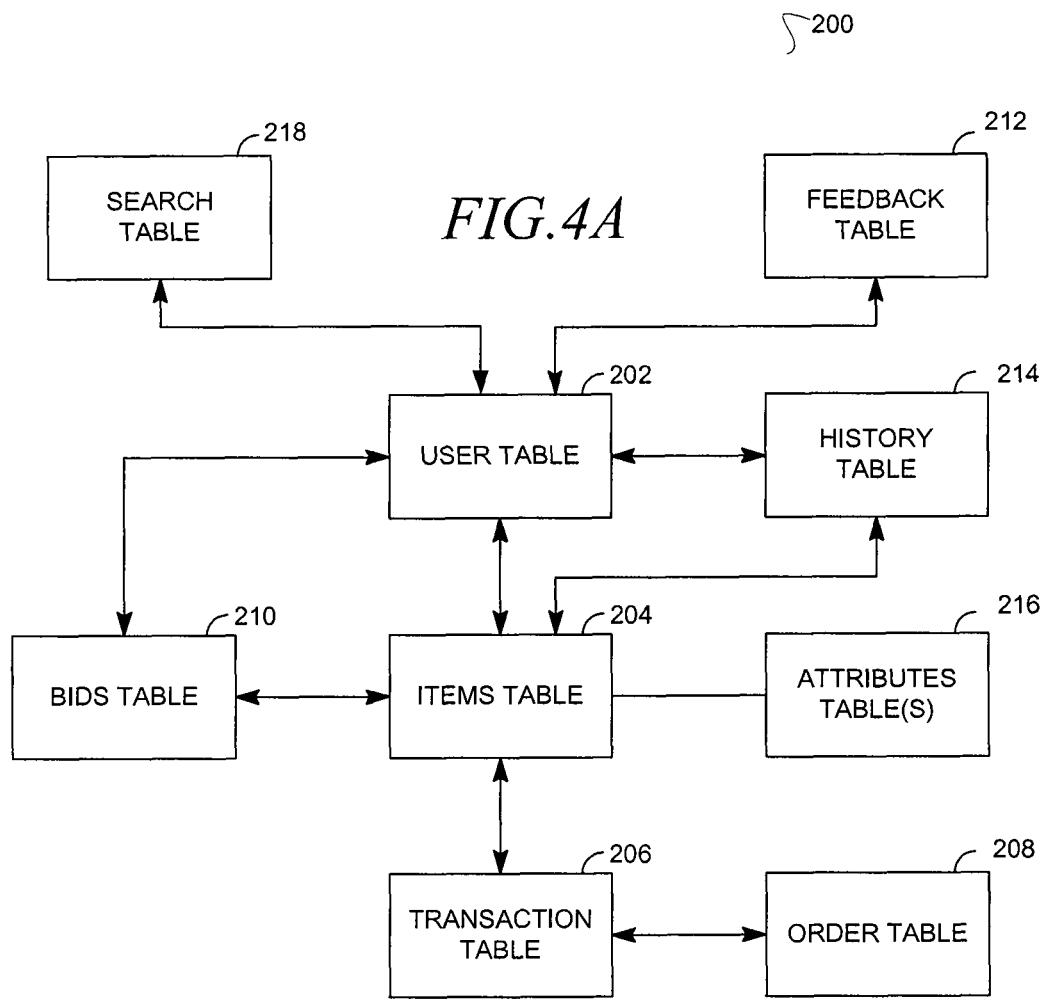
FIG. 4A is a block diagram illustrating tables, according to an embodiment.

FIG. 4A is a high-level entity-relationship diagram, illustrating various tables 200 that may be maintained within the databases 36, and that are utilized by and support the marketplace applications 30 and payment applications 32. A user table 202 contains a record for registered users of the network-based marketplace 12. A user may operate as a seller, a buyer, or both, within the network-based marketplace 12. In one example embodiment, a buyer may be a user that has accumulated value (e.g., commercial or proprietary currency), and is accordingly able to exchange the accumulated value for items that are offered for sale by the network-based marketplace 12.

The tables 200 also include an items table 204 in which item records are maintained for goods and services that are available to be, or have been, transacted via the network-based marketplace 12. Item records within the items table 204 may furthermore be linked to one or more user records within the user table 202, so as to associate a seller and one or more actual or potential buyers with an item record.

A transaction table 206 contains a record for each transaction (e.g., a purchase or sale transaction) pertaining to items for which records exist within the items table 204.

An order table 208 is populated with order records, with each order record being associated with an order. Each order, in turn, may be associated with one or more transactions for which records exist within the transaction table 206.

Bid records within a bids table 210 relate to a bid received at the network-based marketplace 12 in connection with an auction-format listing supported by an auction application 42. A feedback table 212 is utilized by one or more reputation applications 48, in one example embodiment, to construct and maintain reputation information concerning users. A history table 214 maintains a history of transactions to which a user has been a party. One or more attributes tables 216 record attribute information pertaining to items for which records exist within the items table 204. Considering only a single example of such an attribute, the attributes tables 216 may indicate a currency attribute associated with a particular item, with the currency attribute identifying the currency of a price for the relevant item as specified in by a seller.

A search table 218 may store search information that has been entered by a user (e.g., buyer) who is looking for a specific type of listing.

Figure 4B:
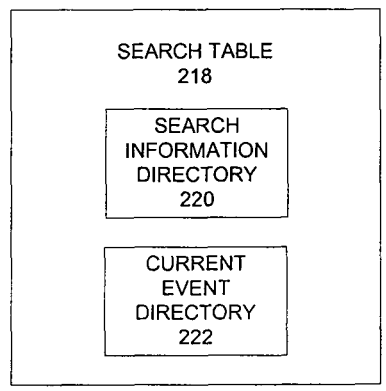
FIG. 4B is a block diagram illustrating a search table, according to an embodiment.

FIG. 4B is a block diagram illustrating a search table 218, according to an embodiment. The search table 218 may be used to arrange items in search results or to select an advertisement. The search table 218 may include a search information directory 220 and a current event directory 222.

Figure 5A:
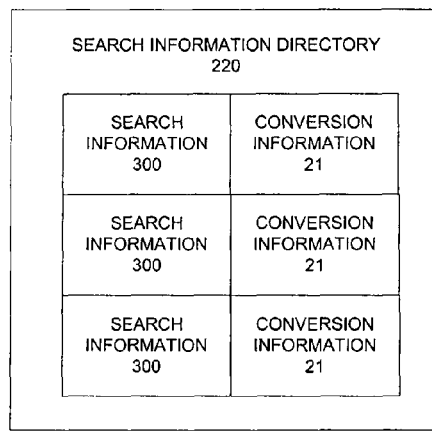
FIG. 5A is a block diagram illustrating a search information directory, according to an embodiment.

FIG. 5A is a block diagram illustrating a search information directory 220, according to an embodiment. The search information directory 220 includes multiple entries that respectively may include search information 300 and conversion information 21. The search information 300 may include keywords, categories and/or parameters such as price range and/or any other information that may be used to search for items on the network-based marketplace 12. For example, the search information 300 may include the keywords "Plasma Screen TV." An entry of search information 300 corresponds to an entry of conversion information 21. The conversion information 21 describes items that are ordered according to a likelihood of conversion (e.g., purchased) in some period of time after receipt of the associated search information 300. The conversion information 21 may be generated from previous traffic and used to arrange items in search results or to select an advertisement. In one example, search information 300 may be received in a request and compared with search information 300 to identify a match. In response to a match, the corresponding conversion information 21 may be identified. The conversion information 21 may be used to arrange items in search results or to select an advertisement.

Figure 5B:
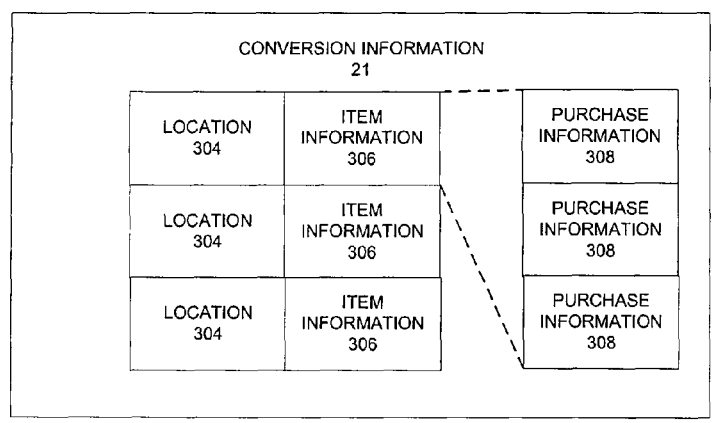
FIG. 5B is a block diagram illustrating conversion information, according to an embodiment.

FIG. 5B is a block diagram illustrating conversion information 21, according to an embodiment. The conversion information 21 corresponds to search information 300 in the search information directory 220 and provides an order of items from most likely to be purchased to least likely to be purchased according to location. The conversion information 21 includes multiple entries that respectively may include a location 304 and item information 306. The location 304 may identify a location or place from which a call from a mobile device 11 may be received. For example, the location 304 may be an area on a map identified by a request received from a mobile device 11. For example, the mobile device 11 may communicate location information to the network-based marketplace 12. The location information may include a cell site, a set of coordinates (e.g., global positioning system), or any other information that identifies the location of the mobile device 11 or may be used by the network-based marketplace 12 to identify the location 17 of the mobile device 11. The location information may be used to identify a perimeter of an area that may be described with longitudinal and latitudinal coordinates. For example, an area may resemble a circle, a square, a rectangle, or some other shape.

The item information 306 includes an order of items from most likely to be purchased to least likely to be purchased, as described further below. The item information 306 is associated with multiple purchase information 308 that respectively represent purchases on the network-based marketplace 12. For example, the purchase information 308 may include an item identifier, a winning bid amount, an authorization to purchase an item for a fixed-price and other information. The item information 306 is generated from the purchase information 308. Accordingly, the item information 306 includes an order of items from most likely to be purchased to least likely to be purchased according to search information 300 and purchase information 308 that are both received from a mobile device 11 in a location 304.

Figure 5C:
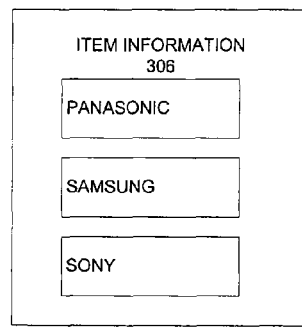
FIG. 5C is a block diagram illustrating item information, according to an embodiment.

FIG. 5C is a block diagram illustrating item information 306, according to an embodiment. The item information 306 may include multiple entries that respectively include an item description. The item description may describe an item (e.g., product or service). Items or descriptions of items may appear in the item information 306 from most likely to be purchased to least likely to be purchased. For example, the item information 306 may include "Panasonic," "Samsung," and "Sony," with "Panasonic" being the most likely to be purchased and "Sony" being the least likely to be purchased. In another embodiment, the item information 306 may include categories that may be used to classify items. For example, the item information 306 may include the categories "150 inch screen," "140 inch screen," and "130 inch screen," with the "150 inch screen" being the most likely to be purchased and the "130 inch screen" being the least likely to be purchased. Recall that any particular item information 306 corresponds to a location 304 and search information 300. For example, the search information 300 may include the keywords "Plasma Screen TV," the location 304 may include an area resembling a square located in Santa Clara County, Calif., and the item information 306 may include "Panasonic," "Samsung," and "Sony," as previously related.

Figure 6A:
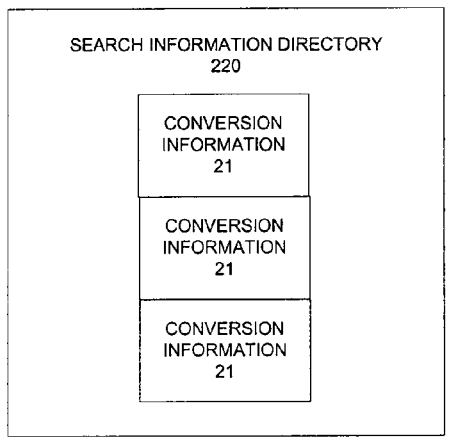
FIG. 6A is a block diagram illustrating a search information directory, according to an embodiment.

FIG. 6A is a block diagram illustrating a search information directory 220, according to an embodiment. The search information directory 220 includes conversion information 21. The conversion information 21 may be generated from previous traffic and used to arrange items in search results or to select an advertisement.

In one example, search information may be received in a request and compared with search information 300 to identify a match. In response to a match, the corresponding conversion information 21 may be identified. The conversion information 21 may be used to arrange items in search results or to select an advertisement.

Figure 6B:
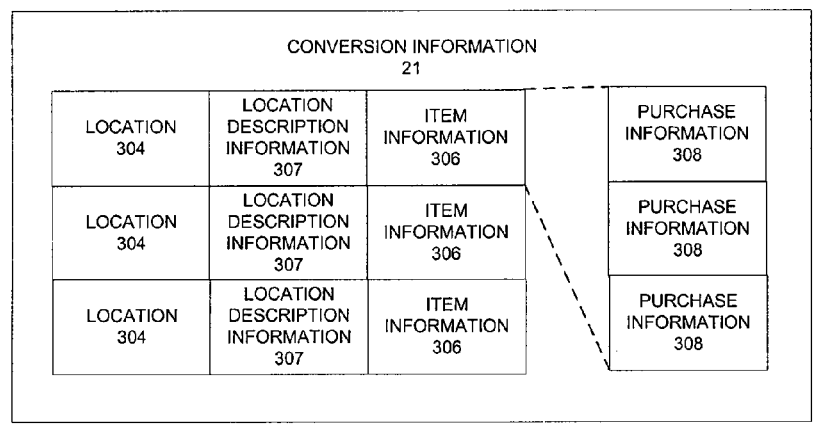
FIG. 6B is a block diagram illustrating conversion information, according to an embodiment.

FIG. 6B is a block diagram illustrating conversion information 21, according to an embodiment different from the embodiment illustrated in FIG. 5B. The conversion information 21 includes multiple entries that respectively may include a location 304, location description information 307, and item information 306. The item information 306 is associated with multiple entries of purchase information 308. The location 304, the item information 306, and the purchase information 308 have previously been described. The location description information 307 may be used to characterize the location 304. For example, the location description information 307 may include a list of retail stores that operate in the location 304, the freeways and/or major streets in the location 304, a list of restaurants that operate in the location 304, a list of services that operate in the location 304, or any other parameter that may be used to characterize the location 304. Further, for example, the location description information 307 may include categories that may be used to characterize the location 304. For example, one location 304 may be associated with the categories of "fast food," "electronics," and "books." In one embodiment, the categories may further be associated with a percentage to characterize the location 304. For example, "fast food=30%," "electronics=20%," and "books=10%," where the percentage expresses the number of corresponding business establishments divided by the total number of business establishments in the designated location 304. The location description information 307 may be used to identify matching areas. For example, in one embodiment, two locations 304 that include the retail store "Best Buy" may be identified as matching. Other embodiments may use a predetermined threshold that utilizes categories. For example, in one embodiment, two locations 304 that include the category "fast food" with a percentage greater than a predetermined threshold may be identified as matching.

Figure 6C:
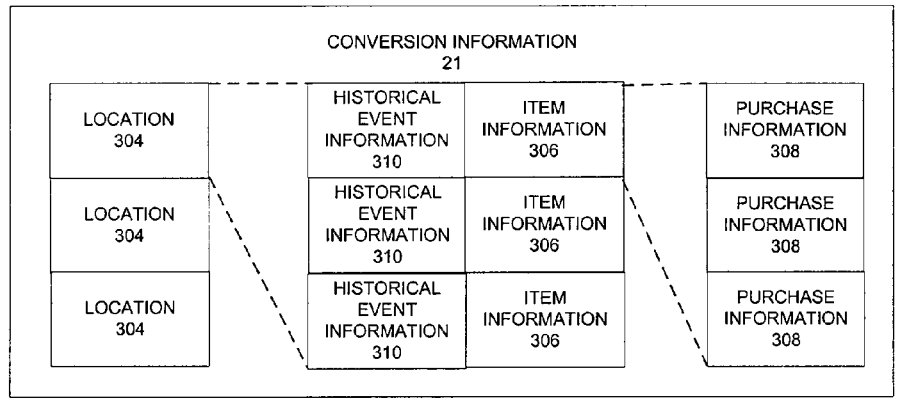
FIG. 6C is a block diagram illustrating conversion information, according to an embodiment.

FIG. 6C is a block diagram illustrating conversion information 21, according to an embodiment different from the embodiments illustrated in FIG. 5B and FIG. 6B. The conversion information 21 includes multiple locations 304. The location 304 was described previously. A single location 304 includes multiple historical event information 310 associated with corresponding item information 306 and purchase information 308. The item information 306 and purchase information 308 have previously been described. A single historical event information 310 describes an event that previously occurred at the location 304. For example, an event may include a concert (e.g., Bono Concert), a traffic jam, a food festival, a sale, an airport delay, a political rally, a showing of a movie, a lecture, a celebrity appearance, and so forth. An event corresponds to item information 306. Accordingly, different events may be associated with different item information 306.

Figure 7A:
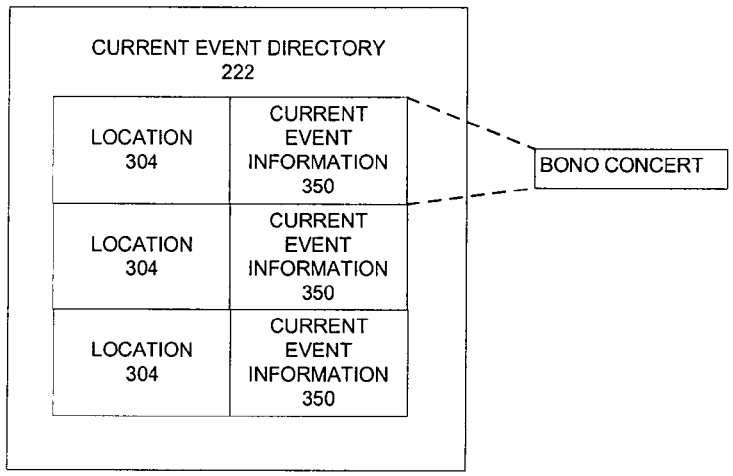
FIG. 7A is a block diagram illustrating a current event directory, according to an embodiment.

FIG. 7A is a block diagram illustrating a current event directory 222, according to an embodiment. The current event directory 222 includes multiple entries that respectively include a location 304 and current event information 350. The location 304 has previously been described. The current event information 350 includes a description of one or more events that are presently occurring in the location 304 and/or a description of one or more events that are scheduled to occur in the location 304. Examples of events have been previously described. The current event information 350 for an event may include a description, a start date, a start time, an end date, and an end time.

Figure 7B:
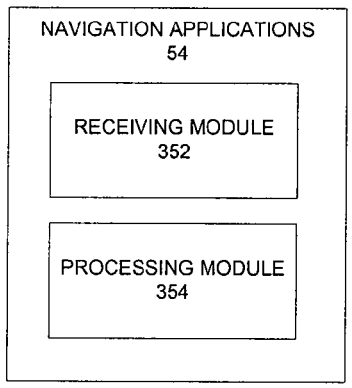
FIG. 7B is a block diagram illustrating navigation applications, according to an embodiment.

FIG. 7B is a block diagram illustrating navigation applications 54, according to an embodiment. The navigation applications 54 include a receiving module 352 and a processing module 354. The receiving module 352 may receive a request to search for items on the network-based marketplace 12. The request to search for items may include search information and location information. In addition, the receiving module 352 may receive a request to purchase items on the network-based marketplace 12. The request to purchase items may include purchase information and location information. In one embodiment, the purchase information may include a winning bid in an auction. In another embodiment the purchase information may include a fixed-price to purchase an item. In addition, the receiving module 352 may receive a current event for a location.

The processing module 354 may process a request 15 to search for items. For example, the processing module 354 may process the request 15 by arranging items in the search results or by selecting an advertisement to be included in an interface with the search results. Further, the processing module 354 may process the request 23 to purchase items by generating conversion information 21. For example, the processing module 354 may associate the request 23 to purchase items with a previously received request 15 to search items to generate the conversion information 21.

Figure 7C:
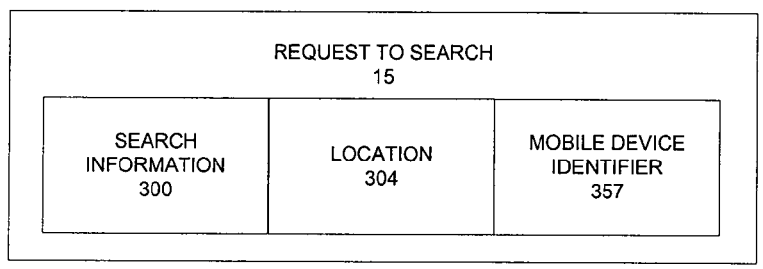
FIG. 7C is a block diagram illustrating a request, according to an embodiment, to search.

FIG. 7C is a block diagram illustrating a request 15, according to an embodiment, to search for items. The request 15 to search for items includes search information 300, a location 304, and a mobile device identifier 357. The search information 300 may include keywords and/or categories and/or parameters such as price range and/or any other information that may be used to search for items on the network-based marketplace 12. Examples have been provided. The location 304 has already been described. The mobile device identifier 357 uniquely identifies the mobile device 11 that communicated the request 15 from other mobile devices 17.

Figure 7D:
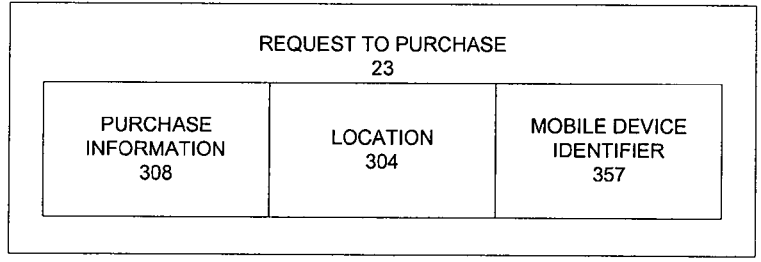
FIG. 7D is a block diagram illustrating a request, according to an embodiment, to purchase.

FIG. 7D is a block diagram illustrating a request 23, according to an embodiment, to purchase items. The request 23 to purchase items includes purchase information 308, location 304, and a mobile device identifier 357. The purchase information 308 may include an item identifier, a winning bid amount, and an authorization to purchase an item for a fixed-price. The location 304 and mobile device identifier 357 have already been described.

Methods of Operation

Return Search Results According to Location of Mobile Device

FIG. 8A is a flow chart illustrating a method 400, according to an embodiment, to generate conversion information 21. As an overview, the method illustrated in FIG. 8B uses the conversion information 21 generated by the method 400 in FIG. 8A to return search results according to the location of the mobile device.

Illustrated on the left of FIG. 8A are operations performed at the mobile device 11. Illustrated on the right are operations performed at the application server 28 (e.g., server machine). The method 400 refers to the search information directory 220 as illustrated in FIG. 5A and the conversion information 21 as illustrated in FIG. 5B. The method 400 commences, at operation 402, with the mobile device 11 communicating a request 23 to purchase an item. The request 23 may include the purchase information 308, the location 304 of the mobile device, and a mobile device identifier 357. For example, the purchase information 308 may include an item identifier for a "SONY Plasma Screen TV," and an amount of purchase. The location 304 may identify a location in San Jose, Calif., and the mobile device identifier 357 may identify the mobile device "123456789."

At operation 404, the receiving module 352 at the application server 28 receives the request 23 to purchase the item. Next, the processing module 354 processes the request 23 to purchase the item. For example, the processing module 354 may process a winning bid to win an item an auction or an authorization to pay a fixed-price for the item. At operation 406, the processing module 354 associates the request 23 to purchase the item with a previously received request 23 to search for items. For example, the processing module 354 may make the association based on matching mobile device identifiers 357. In one embodiment, the processing module 354 may search for a matching and previously received request 15 to search within a predetermined period of time (e.g., five minutes) of receipt of the request 23 to purchase. The request 23 to search includes search information 300 and a location 304. At operation 408, the processing module 354 stores the purchase information 308 according to the search information 300 and the location 304 in the search information directory 220.

At operation 410, the processing module 354 generates item information 306. The processing module 354 may generate the item information 306 by aggregating the purchase information 308. For example, the processing module 354 may generate the item information 306 by identifying purchase information 308 for the purchase of "Panasonics" twice as often as purchase information 308 for "Samsung." Accordingly, the processing module 354 may generate item information 306 that includes an order of items or categories, as previously described.

At operation 412, the processing module 354 stores the item information 306 according to the appropriate search information 300 and location 304 in the search information directory 220.

FIG. 8B is a flow chart illustrating a method 440, according to an embodiment, to search with a mobile device. Illustrated on the left are operations performed at the mobile device 11. Illustrated on the right are operations performed at the application server 28 (e.g., server machine). The method 440 commences, at operation 442, with the mobile device 11 communicating a request 15 to search for items. The request 15 may include the search information 300, the location 304 of the mobile device 11, and a mobile device identifier 357. For example, the search information 300 may include the keywords "Plasma Screen TV," the location 304 may identify a location in San Jose, Calif., and the mobile device identifier may identify mobile device 11 "1234565789."

At operation 444, at the application server 28, the receiving module 352 receives the request 15 and at operation 446 the processing module 354 generates search results 19 based on the request 15. The search results 19 include descriptions of items. The items may be various models of Plasma Screen TVs. The Plasma Screen TV's may further be made by different manufacturers. For example, the search results 19 may include ten items made by Panasonic, twenty items made by Samsung, and fifteen items made by Sony. At operation 448, the processing module 354 arranges the items in the search results 19 in an order based on item information 306 that is associated with the search information 300 and the location 304, as described later. For example, the search results 19 may be arranged to present the Panasonic items first, the Samsung items second, and the Sony items last. At operation 450, the processing module 354 may identify an advertisement from multiple advertisements based on the same item information 306. At operation 452, the processing module 354 generates an interface (e.g., user interface, machine interface, audio interface) that includes the arranged search results 19 and the advertisement. At operation 454, the processing module 354 communicates the interface to the mobile device 11. At operation 456, the mobile device 11 displays the search results 19 to the operator of the mobile device 11 and the process ends.

Figure 9A:
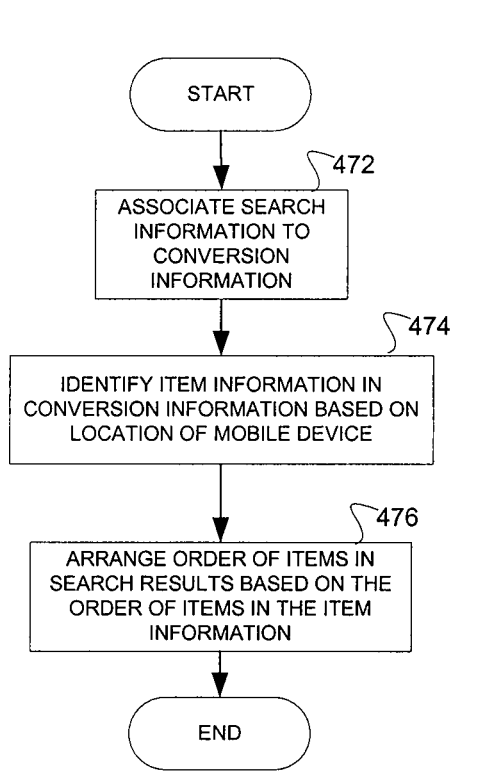
FIG. 9A is a flow chart illustrating a method, according to an embodiment, to arrange items in search results.

FIG. 9A is a flow chart illustrating a method 470, according to an embodiment, to arrange items in search results 19. The method 470 corresponds to the operation 448 on FIG. 8B. The method 470 commences at operation 472 with the processing module 354 associating the search information 300 with conversion information 21. Specifically, the processing module identifies the conversion information 21 by matching the search information 300 included in the request 15 to search for items with the search information 300 included in the search information directory 220, as described in FIG. 9B. At operation 474, the processing module 354 identifies item information 306 in the conversion information 21 based on the location of the mobile device. For example, the processing module 354 may match the location 304 in the request 15 to search for items with the location 304 in the conversion information 21. In response to identifying a matching location 304 the processing module 354 uses the corresponding item information 306 in the conversion information 21. At operation 476, the processing module uses an order of items as specified by the item information 306 to arrange the items in the search results 19 in an order from most likely to be purchased to least likely to be purchased.

Figure 9B:
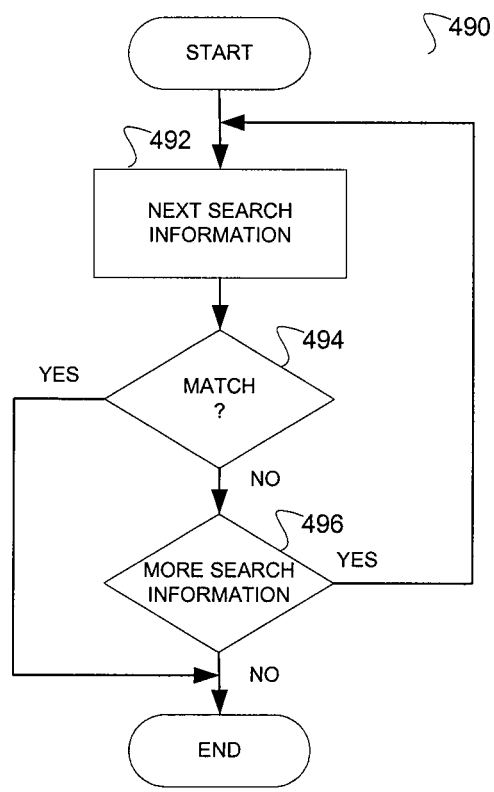
FIG. 9B is a flow chart illustrating a method, according to an embodiment, to associate search information to conversion information.

FIG. 9B is a flow chart illustrating a method 490, according to an embodiment, to associate search information 300 to conversion information 21. The method 490 commences at operation 492 with the processing module 354 retrieving the next search information 300 from the search information directory 220. At decision operation 494, the processing module 354 identifies whether the search information 300 from the search information directory 220 matches the search information 300 in the request 15 to search for items. If a match is found then processing ends. Otherwise, processing continues at operation decision operation 496. At decision operation 496, the processing module 354 identifies whether more search information 300 may be retrieved from the search information directory 220. If more search information 300 may be retrieved then processing continues at operation 492. Otherwise processing ends.

Figure 10:
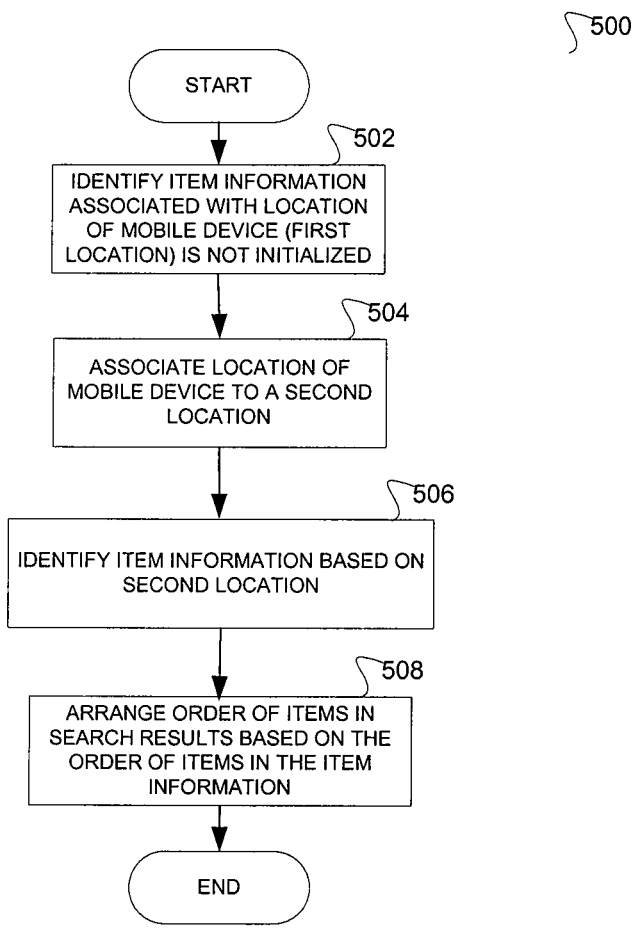
FIG. 10 is a flow chart illustrating a method, according to an embodiment, to arrange items in search results.

Return Search Results According to a Location that Matches the Location of Mobile Device FIG. 10 is a flow chart illustrating a method 500, according to an embodiment, to arrange items in search results 19. The method 500 corresponds to the operation 448 on FIG. 8B. The method 500 uses the embodiment of the search information directory 220 as shown in FIG. 6A and the embodiment of conversion information 21 as shown in FIG. 6B. Illustrated on the left of FIG. 8A are operations performed at the mobile device 11. Illustrated on the right are operations performed at the application server 28 (e.g., server machine).

The method 500 commences at operation 502 with the processing module 354 identifying item information that is not initialized. Specifically, the processing module 354 uses the location 304 in the request 15 to identify a matching location 304 in the conversion information 21. In response to finding a match, the processing module 354 identifies item information 306 that is associated with the matched location 304, with the item information 306 not being initialized. For example, the item information 306 may not be initialized because the purchase information 308 has not exceeded a predetermined threshold to trigger the processing module 354 to generate the item information 306 from the purchase information 308.

At operation 504, the processing module 354 associates the location 304 of the mobile device 11 to a second location. For example, the processing module 354 uses the location 304 in the request 15 to identify a matching location 304 in the conversion information 21. In response to finding a match, the processing module 354 identifies location description information 307 that is associated with the matched location 304. You may recall that the location description information 307 includes information that may be used to characterize a location 304. Next, the processing module 354 identifies a second location based on matching location description information 307. For example, two locations 304 may match because both locations include a single retail store, "Best Buy."

At operation 506, the processing module 354 identifies item information 306 based on the second location 304. For example, the second location 304 in the conversion information 21 is associated with the identified item information 306.

At operation 508, the processing module 354 uses an order of items as specified by the item information 306 to arrange the items in the search results 19. For example, the processing module 354 may arrange the items in an order from most likely to be purchased to least likely to be purchased based on the item information 306.

Return Search Results According to an Event at the Location of Mobile Device that Matches an Event at a Second Location FIG. 11A is a flow chart illustrating a method 550, according to an embodiment, to arrange items in search results 19. The method 550 corresponds to the operation 448 on FIG. 8B. The method 550 uses the embodiment of the search information directory 220 as shown in FIG. 6A and the embodiment of conversion information 21 as shown in FIG. 6C.

The method 550 commences at operation 552 with the processing module 354 identifying item information 306 that is not initialized. Specifically, the processing module 354 uses the location 304 in the request 15 to identify a matching location 304 in the conversion information 21. In response to finding a match, the processing module 354 identifies item information 306 that is associated with the matched location 304. Next, the processing module 354 identifies the item information 306 as not initialized. For example, the item information 306 may not be initialized because the quantity of purchase information 308 has not exceeded a predetermined threshold.

At operation 554, the processing module 354 identifies a current event that is occurring or scheduled to occur in the location 304 of the mobile device 11. For example, the processing module 354 uses the location 304 in the request 15 to identify a matching location 304 in the current event directory 222. In response to finding a match, the processing module 354 identifies current event information 350 that is associated with the matched location 304. For example, the current event information 350 may include an event in the form of a "Bono Concert" scheduled for 8:00 PM tonight.

At operation 556, the processing module 354 identifies an historical event in a different location 304 that matches the current event in the location 304 of the mobile device 11. For example, the processing module 354 may identify a second location 304 where the "Bono Concert" was previously performed.

At operation 558, the processing module 354 retrieves item information 306 associated with the location 304 where the "Bono Concert" previously performed. For example, the processing module 354 accesses the conversion information 21 and retrieves the item information 306 associated with the location 304 where the "Bono Concert" previously performed.

At operation 560, the processing module 354 uses an order of items as specified by the item information 306 to arrange the items in the search results 19 and then the process ends. For example, the processing module 354 may arrange the items in an order from most likely to be purchased to least likely to be purchased based on the item information 306.

FIG. 11B is a flow chart illustrating a method 580, according to an embodiment, to identify an historical event that matches the current event occurring in the location of the mobile device 11. The method 580 uses the embodiment of the search information directory 220 as shown in FIG. 6A and the embodiment of conversion information 21 as shown in FIG. 6C. The method 580 corresponds to the operation 556 on FIG. 11A.

The method 580 commences at operation 582 with the processing module 354 retrieving the next location 304 from the conversion information 21. At operation 584, the processing module 354 retrieves the next historical event information 310 at the present location 304. At decision operation 586, the processing module 354 identifies whether the historical event included in the historical event information 310 matches any of the current event(s) occurring at the location of the mobile device 11 or scheduled for occurrence at the location of the mobile device 11. If a match is found the process ends. Otherwise, processing continues at decision operation 588. At decision operation 588, the processing module 354 identifies whether there is more historical event information 310. If there is more historical event information 310, then processing continues at operation 584. Otherwise processing continues at decision operation 560. At decision operation 560, the processing module 354 identifies whether there are more locations 304. If there are more locations, processing continues at operation 582. Otherwise processing ends.

Interfaces

Figure 12:
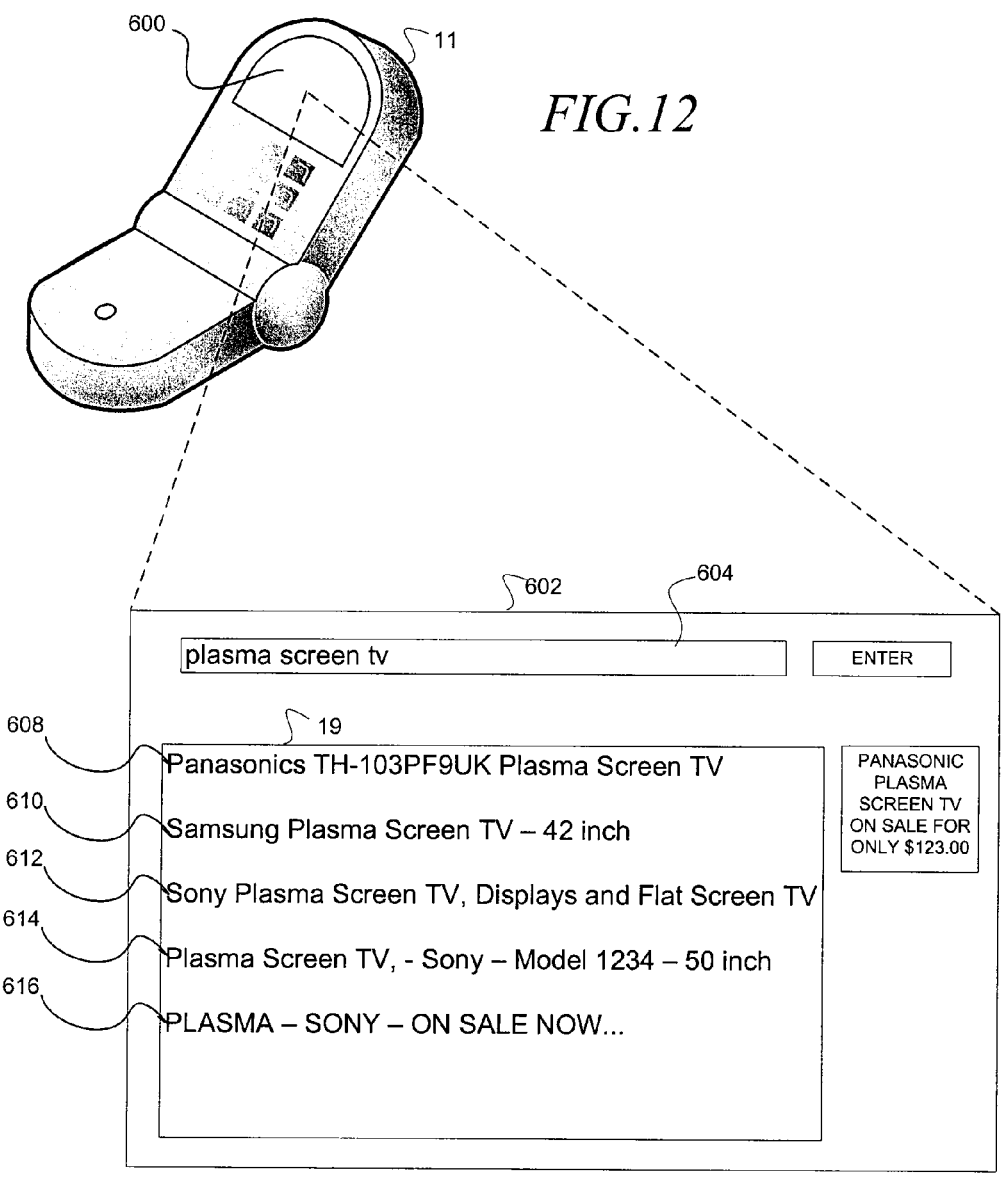
FIG. 12 is diagram illustrating a mobile device, according to an embodiment.

FIG. 12 is diagram illustrating a mobile device 11, according to an embodiment. The mobile device 11 includes a screen 600. The screen 600 is illustrated as displaying a user interface 602. The user interface 602 includes an input box 604 to receive search information 300 to enable the mobile device 11 to communicate the search information 300 to the network-based marketplace 12. The user interface 602 is further shown to include search results 19. The search results 19 include an item 608 in the form of a Panasonic Plasma Screen TV, an item 610 in the form of a Samsung Plasma Screen TV, and items 612, 614, 616 in various forms of Sony Plasma Screen TVs. The items 608, 610, 612, 614 and 616 have been arranged in an order from most likely to be purchased to least likely to be purchased. For example, the item 608 is most likely to be purchased and the item 616 is least likely to be purchased.

The user interface 602 is shown to include user interface elements. However, it will be appreciated by those skilled in the art that the user interface 602 may also be embodied as a machine interface (e.g., Standard Generalized Markup Language—SGML) including machine interface elements, an audio interface including audio interface elements, a kinetic interface including kinetic interface elements, or some other type of interface.

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage, tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

Figure 13:
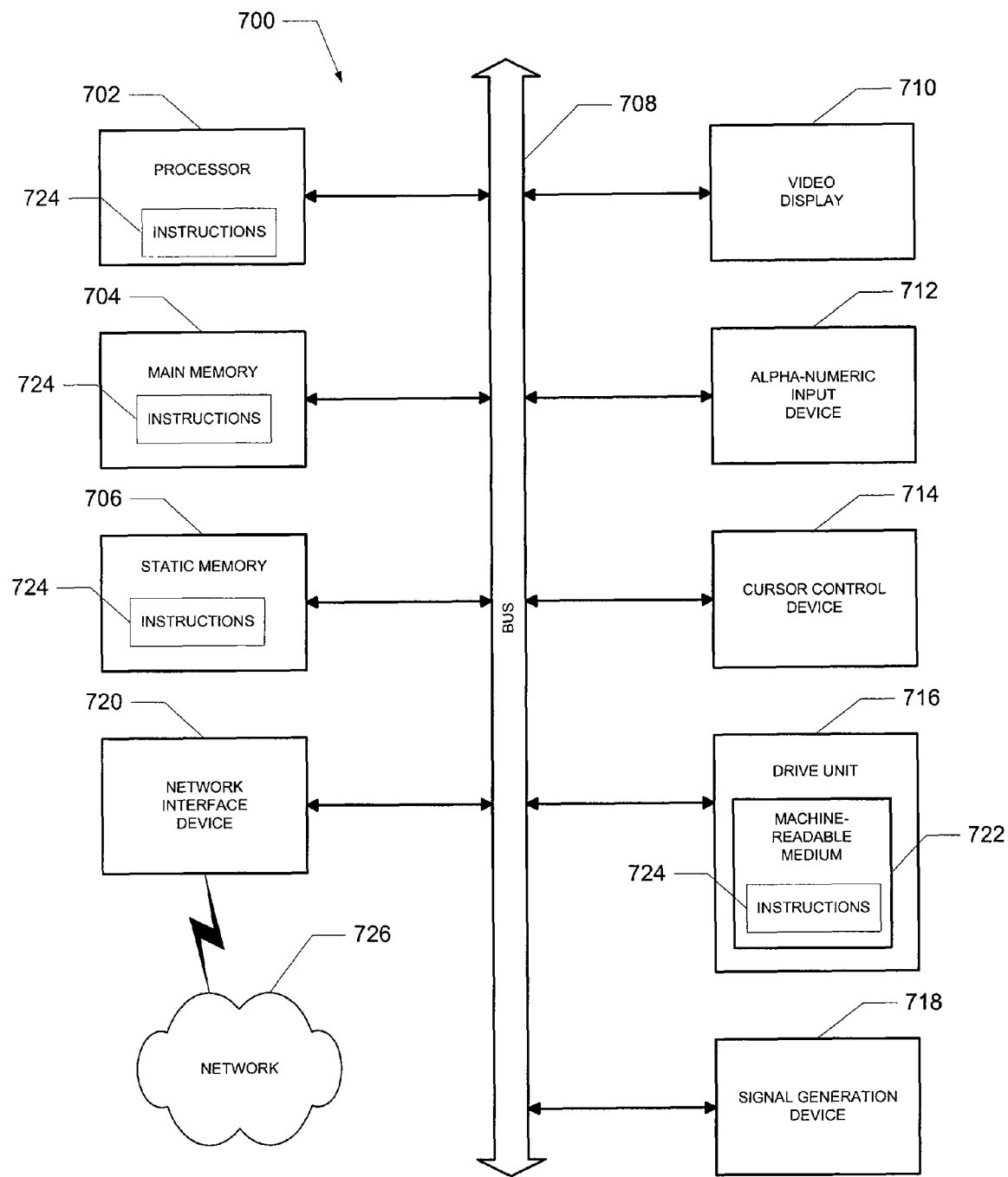
FIG. 13 shows a diagrammatic representation of a machine in the example form of a computer system, according to an example embodiment.

FIG. 13 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g. a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to search with a mobile device are are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system comprising:
at least one processor;
a receiving module that is executable by the at least one processor to receive a request, over a network, from a mobile device, the request including search information that is utilized to search a database and location information including a first location that identies the present location of the mobile device; and
a processing module that is executable by the at least one processor to generate search results based on the search information, the search results including a plurality of items, the processing module to arrange the plurality of items in the search results based on the search information and the first location, the processing module to identify in conversion information the first location as not associated with an order of most likely item to be purchased to least likely item to be purchased, the processing module to associate the first location with a second location that is associated with an order of most likely item to be purchased to least likely item to be purchased at the second location, the processing module to further arrange the plurality of items into a first arrangement based on the order associated with the second location, the processing module to communicate a user interface, over the network, to the mobile device, the user interface including the plurality of the items being presented in accordance with the first arrangement.

2. The system of claim 1, wherein the processing module further associates the search information to the conversion information, the conversion information including a plurality of item information that is respectively associated with a plurality of locations that includes the second location.

3. The system of claim 1, wherein the processing module is to select a first advertisement from a plurality of advertisements based on the first arrangement and generate the user interface to further include the first advertisement.

4. A method comprising:
receiving a request, over a network, from a mobile device, the request including search information to search a database and location information including a first location that identifies the present location of the mobile device;
generating search results based on the search information, the search results including a plurality of items;
arranging the plurality of items in the search results based on the search information and the first location, the arranging including:
identifying, in conversion information, the first location as not being associated with an order of most likely item to be purchased to least likely item to be purchased;
associating the first location with a second location that is associated with an order of most likely item to be purchased to least likely item to be purchased at the second location;
arranging the plurality of items into a first arrangement based on the order associated with the second location; and
communicating a user interface, over the network, to the mobile device, the user interface including the plurality of the items being presented in accordance with the first arrangement.

5. The method of claim 4, wherein the arranging the plurality of items in the search results further includes associating the search information to the conversion information that includes a plurality of item information that is respectively associated with a plurality of locations that includes the second location.

6. The method of claim 4, further including:
identifying a first advertisement by selecting the first advertisement from a plurality of advertisements based on the first arrangement; and
generating the user interface to further include the first advertisement.

7. The method of claim 4, wherein the associating the first location with the second location includes identifying a first commercial establishment that is located in the first location and a second commercial establishment that is located in the second location.

8. The method of claim 7, wherein the associating the first location with the second location includes identifying the first and second commercial establishments are matching commercial establishments.

9. The method of claim 8, wherein the identifying the first and second commercial establishments are matching commercial establishments includes identifying the first and second commercial establishments as different retail outlets of the same company.

10. The method of claim 4, further comprising:
receiving the search information from a plurality of mobile devices respectively, the plurality of mobile devices including a first mobile device and a second mobile device;
generating a plurality of search result sets based on the search information, the plurality of search result sets including a first result set and a second result set; and
communicating the plurality of search results sets to the plurality of mobile devices respectively, the first search result set being communicated to the first mobile device and the second result set being communicated to the second mobile device.

11. The method of claim 10, further comprising:
receiving purchase information from the plurality of mobile devices, the purchase information describing purchases of a second plurality of items from the plurality of mobile devices while located at the second location, the receiving information purchase comprising:
receiving purchase information for a first item from the first mobile device; and
receiving purchase information for a second item from the second mobile device.

12. The method of claim 10 further comprising generating an order of most likely item to be purchased to least likely item to be purchased at the second location based on the purchase information that were utilized to purchase items.

13. A system comprising:
a receiving module to receive a request, over a network, from a mobile device, the request including search information that is utilized to search a database and location information including a first location that identifies a present location of the mobile device; and
a means for generating search results based on the search information, the search results including a plurality of items, the means for arranging the plurality of items in the search results based on the first location, the means for further identifying, in conversion information, the first location as not being associated an order of most likely item to be purchased to least likely item to be purchased, the means for further associating the first location with a second location that is associated with an order of most likely item to be purchased to least likely item to be purchased at the second location, the means for further arranging the plurality of items into a first arrangement based on the order associated with the second location, the means for communicating a user interface, over the network, to the mobile device, the user interface including the search results presented in accordance with the first arrangement.

14. A machine-readable medium storing instructions that, when executed by a processor, cause the processor to perform the following actions:
receive a request, over a network, from a mobile device, the request including search information that is utilized to search a database and location information including a first location that identifies the present to identify a location of the mobile device;
generate search results based on the search information, the search results including a plurality of items;
identify in conversion information the first location as not being associated with an order of most likely item to be purchased to least likely item to be purchased;
associate the first location with a second location that is associated with an order of most likely item to be purchased to least likely item to be purchased at the second location;
arrange the plurality of items into a first arrangement based on the order associated with the second location; and
communicate a user interface, over the network, to the mobile device, the user interface including the plurality of the items presented in accordance with the first arrangement.

* * * * *